United States Patent [19]

Shon

[11] Patent Number: 5,956,632
[45] Date of Patent: Sep. 21, 1999

[54] METHOD FOR DISPLAYING RECEIVED TELEPHONE NUMBER IN MOBILE CORDLESS TELEPHONE

[75] Inventor: Jung-Hak Shon, Gumi, Rep. of Korea

[73] Assignee: SamSung Electronics Co., Ltd., Suwon, Rep. of Korea

[21] Appl. No.: 08/673,816

[22] Filed: Jun. 27, 1996

[51] Int. Cl.$^6$ .................................................. H04M 11/00
[52] U.S. Cl. .......................... 455/404; 455/404; 455/415; 379/142
[58] Field of Search .................................... 455/404, 415; 379/142

[56] References Cited

U.S. PATENT DOCUMENTS

| | | |
|---|---|---|
| 4,873,719 | 10/1989 | Reese . |
| 5,117,449 | 5/1992 | Metroka et al. . |
| 5,251,250 | 10/1993 | Obata et al. . |
| 5,265,145 | 11/1993 | Lim . |
| 5,349,638 | 9/1994 | Pitroda et al. . |
| 5,363,429 | 11/1994 | Fujisawa . |
| 5,398,279 | 3/1995 | Frain . |
| 5,446,785 | 8/1995 | Hirai . |
| 5,524,140 | 6/1996 | Klausner et al. ...................... 379/142 |
| 5,661,788 | 8/1997 | Chin ...................................... 379/142 |

FOREIGN PATENT DOCUMENTS

| | | |
|---|---|---|
| 0 458 563 A2 | 11/1991 | European Pat. Off. . |
| 2 251 764 | 7/1992 | United Kingdom . |
| 2 285 369 | 7/1995 | United Kingdom . |

*Primary Examiner*—Wellington Chin
*Assistant Examiner*—Senai Kibreab
*Attorney, Agent, or Firm*—Robert E. Bushnell, ESq.

[57] ABSTRACT

A method for displaying a telephone number provided from a caller in a mobile cordless telephone contemplates the steps of: determining whether or not a telephone number receiving function is set when an incoming call to the mobile cordless telephone is present; switching from a speech mode to a telephone number receiving mode and receiving the telephone number based on inputs provided from the caller when the telephone number receiving function is set; and simultaneously, storing and displaying the telephone number at the mobile cordless telephone.

13 Claims, 3 Drawing Sheets

METHOD FOR DISPLAYING RECEIVED TELEPHONE NUMBER IN MOBILE CORDLESS TELEPHONE

CROSS-REFERENCE TO RELATED APPLICATIONS

This application makes reference to, incorporates the same herein, and claims all benefits accruing under 35 U.S.C. §119 arising from an application for *Method For Displaying Received Telephone Number In Mobile Cordless Telephone* earlier filed in the Korean Industrial Property Office on Jun. 30, 1995 and there duly assigned Ser. No. 18963/1995.

BACKGROUND OF THE INVENTION

The present invention relates to a mobile cellular communication system, and more particularly, to a method for providing display of a caller's telephone number on a display unit of a mobile cordless telephone.

In general, a cellular telephone is referred to as a portable cordless telephone or a mobile cordless telephone that is attached at a mobile station. A mobile cordless telephone performs cordless communication with a cell site which is wired with an exchange, to thereby perform wired communication. Accordingly, the mobile cordless telephone can perform cordless communication with other cordless telephones, as well as wired communication with a general telephone. A feature that is quite desirable in both wired and wireless communication systems is a caller identification function that provides display of a caller's telephone number at the telephone terminal of a called party.

One recent prior art reference that discusses this feature is U.S. Pat. No. 5,398,279 entitled *Telephone Apparatus With Calling Line Identification* issued to Frain. In Frain '279, a portable cellular telephone includes a memory for storing telephone numbers and a counter for storing the respective number of calls received from the telephone numbers stored in the memory. The telephone may be adapted to display the number of calls received from the telephone numbers stored in the memory, so that the user review at a quick glance how many times a particular caller has made an incoming call. While this type of art is beneficial in its own right, I believe that a simplified method and device for detecting and displaying a caller's telephone number can be contemplated.

SUMMARY OF THE INVENTION

Therefore, it is an object of the present invention to provide an improved and simplified method for providing display of a caller's telephone number on a mobile cordless telephone.

It is another object to provide a method for identifying a caller's telephone number on a mobile cordless telephone that also identifies the time at which the caller's call was received.

It is still another object to provide an improved design for a mobile cordless telephone that provides display of a caller's telephone number.

These and other objects can be achieved according to the present invention with a method for displaying a telephone number provided from a caller in a mobile cordless telephone. The method contemplates the steps of: determining whether or not a telephone number receiving function is set when an incoming call to the mobile cordless telephone is present; switching from a speech mode to a telephone number receiving mode and receiving the telephone number based on inputs provided from the caller when the telephone number receiving function is set; and simultaneously, storing and displaying the telephone number at the mobile cordless telephone.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings, in which like reference symbols indicate the same or similar elements components, wherein.

DETAILED DESCRIPTION OF THE PREFERRED EMBODIMENT

Figure 1:
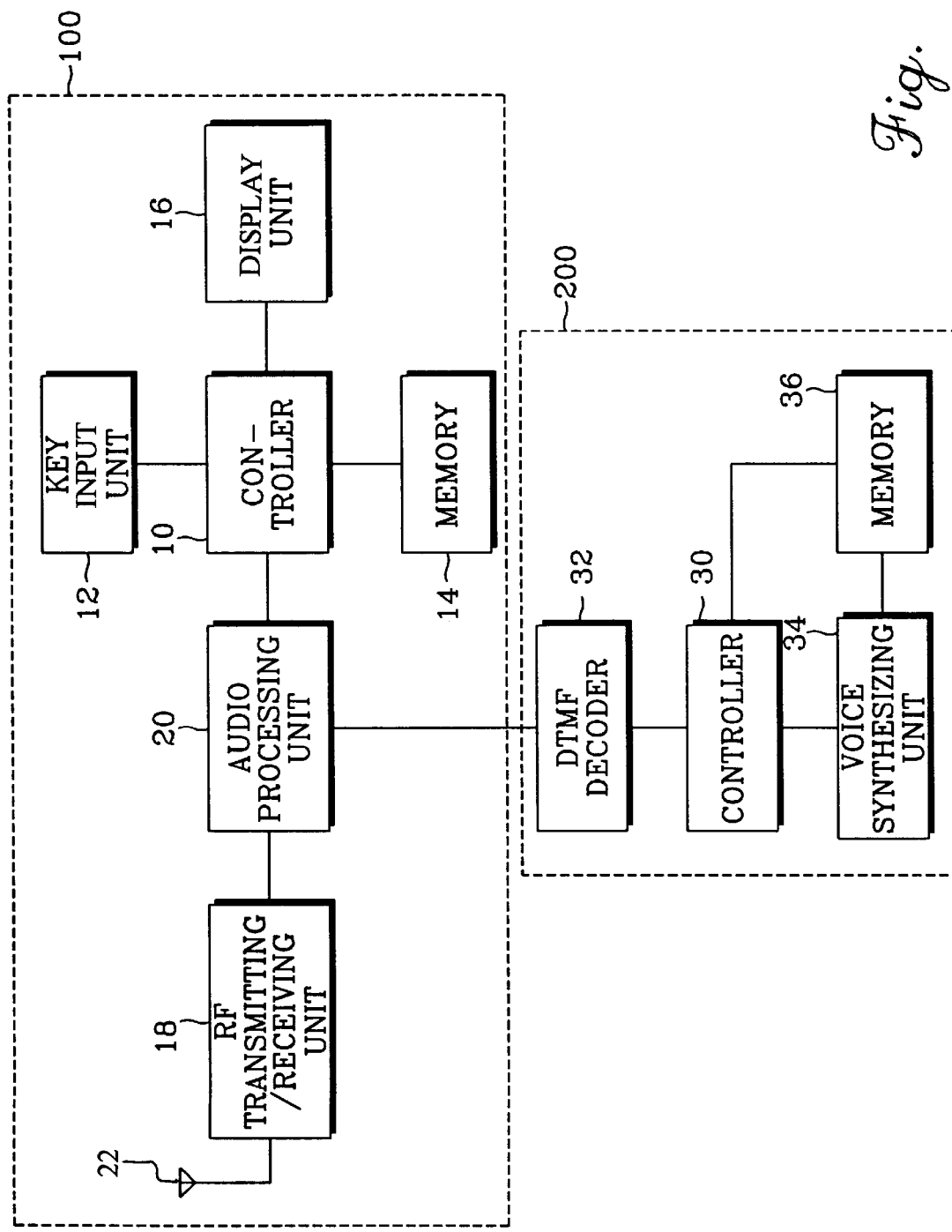
FIG. 1 is a block diagram illustrating the construction of a general mobile cordless telephone.

Turning now to the drawings and referring to FIG. 1, a block diagram illustrating the construction of a general mobile cordless telephone is shown. In FIG. 1, a mobile cordless telephone 100 is connected to a hands-free unit 200 attached at a mobile station. When a user is not carrying mobile cordless telephone 100 and an incoming telephone call is received, mobile cordless telephone 100 transmits a voice message such as, "I am currently unavailable to answer your call", receives a telephone number input by the caller, stores the received telephone number and displays the stored telephone number on a display unit.

In FIG. 1, a controller 10 controls an overall operation of mobile cordless telephone 100. A memory 14 stores a program and initial service data, and temporarily stores data generated during operation of mobile cordless telephone 100. A key input unit 12 generates key data for dialing and enabling display of a received telephone number in mobile cordless telephone 100, and outputs the generated key data to controller 10. A display unit 16 displays the received telephone number and data indicating an operating state under the control of controller 10. A radio frequency (hereinafter, "RF") transmitting/receiving unit 18 converts and demodulates RF signals received through an antenna 22, to thereby output converted and demodulated signals. RF transmitting/receiving unit 18 also receives and modulates transmission data in a format for transmission, and outputs the modulated data to antenna 22. An audio processing unit 20 receives and reproduces signals output from RF transmitting/receiving unit 18. That is, audio processing unit 20 receives and processes the signals output from RF transmitting/receiving unit 18, applies the processed signals to controller 10, and also provides signals received from controller 10 to RF transmitting/receiving unit 18.

Hands-free unit 200 is comprised of a controller 30 for controlling an overall operation of hands-free unit 200. A memory 36 stores a voice message for transmission to a caller. A voice synthesizing unit 34 voice-synthesizes the voice message stored in memory 36 under the control of controller 30, and provides output of the voice-synthesized message. A dual tone multi-frequency (hereinafter, "DTMF") decoder 32 decodes DTMF signals received through audio processing unit 20 of mobile cordless telephone 100, and provides output of decoded signals to controller 30.

The mobile cordless telephone of FIG. 1 has an automatic receiving function and a telephone number receiving function, which are optional features. The automatic receiving function does not provide display of a caller's telephone number at mobile cordless telephone 100, but rather provides display of call frequency. The telephone number receiving function is set by first storing in memory 36 of hands-free unit 200, a message for informing a caller that the called party can not currently answer the telephone and that the caller can input his or her telephone number. During execution of the telephone number receiving function, hands-free unit 200 is connected to mobile cordless telephone 100 upon receipt of an incoming call. Hands-free unit 200 converts the message stored in memory 36 into a voice message, and transmits the voice message to the caller. Upon receipt of the caller's input telephone number, hands-free unit 200 decodes the DTMF signals representative of the caller's telephone number, and transmits the telephone number to mobile cordless telephone 100. Mobile cordless telephone 100 receives the telephone number, and provides display of the received telephone number on display unit 16.

The general mobile cordless telephone described above, however, has a problem in that, unless a hands-free key which is provided at the mobile station is depressed, the telephone number received from the caller can not be displayed.

Figure 2:
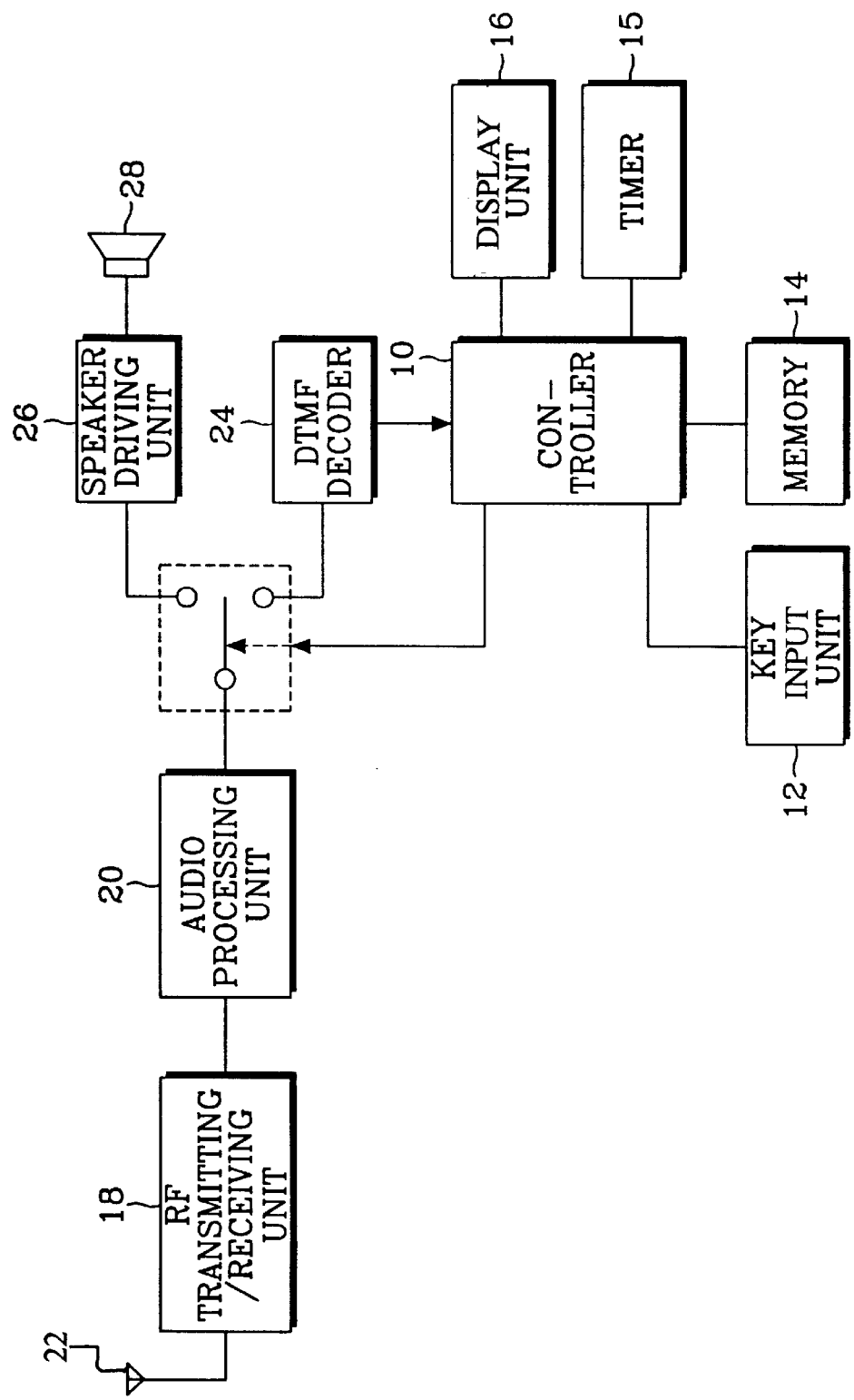
FIG. 2 is a block diagram illustrating the construction of a mobile cordless telephone according to the principles of the present invention.

FIG. 2 is a block diagram illustrating the construction of a mobile cordless telephone according to the principles of the present invention.

Referring now to FIG. 2, a controller 10 controls an overall operation of the mobile cordless telephone. A memory 14 stores a program and initial service data, and temporarily stores data generated during operation of the mobile cordless telephone. A key input unit 12 generates key data for dialing and enabling display of a received telephone number in the mobile cordless telephone, and outputs the generated key data to controller 10. A display unit 16 displays the received telephone number and data indicating an operating state under the control of controller 10. An RF transmitting/receiving unit 18 converts and demodulates RF signals received through an antenna 22, to thereby output converted and demodulated signals. RF transmitting/receiving unit 18 also receives and modulates transmission data in a format for transmission, and outputs the modulated data to antenna 22. An audio processing unit 20 receives and reproduces signals output from RF transmitting/receiving unit 18. That is, audio processing unit 20 receives and processes the signals output from RF transmitting/receiving unit 18, applies the processed signals to controller 10, and also provides signals received from controller 10 to RF transmitting/receiving unit 18. A switching unit 21 switches between a speech mode and a telephone number receiving mode in accordance with a control signal provided from controller 10. When switching unit 21 is switched to the speech mode, a speaker driving unit 26 receives processed audio signals from audio processing unit 20, and outputs the received audio signals to a speaker 28. Alternatively, when switching unit 21 is switched to the telephone number receiving mode, a DTMF decoder 24 decodes DTMF signals received through audio processing unit 20 and provides decoded signals to controller 10. A timer 15 performs a counting operation to generate a current time that is provided to controller 10.

Figure 3:
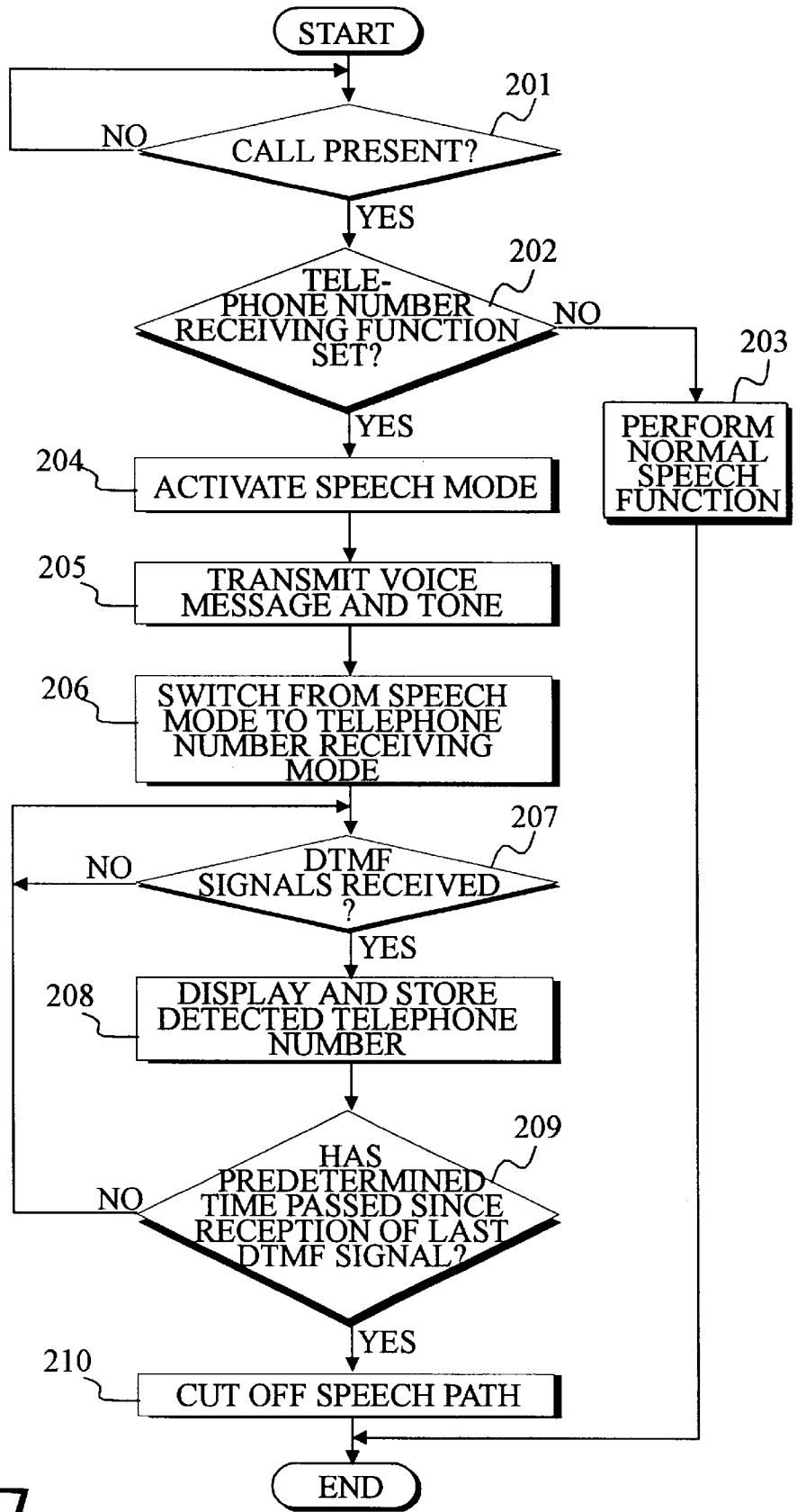
FIG. 3 is a flow chart illustrating steps of displaying a received telephone number in a mobile cordless telephone according to the principles of the present invention.

FIG. 3 is a flow chart illustrating steps of displaying a received telephone number in a mobile cordless telephone according to the principles of the present invention. Briefly, the method of FIG. 3 contemplates the steps of: determining whether or not a telephone number receiving function is set when an incoming call is present; enabling execution of a normal speech function between a caller and a called party in response to an off-hook operation performed by the called party when the telephone number receiving function is not set; activating a speech mode and transmitting a voice message and tone to the caller when the telephone number receiving function is set; switching from the speech mode to a telephone number receiving mode after transmitting the voice message and tone; and detecting a telephone number provided from the caller and simultaneously, storing and displaying the detected telephone number.

A preferred embodiment of the present invention will now be described in detail with reference to FIGS. 2 and 3. It should be noted that a telephone number receiving function must first be set via key input unit 12 in order to perform the method of the present invention. Upon setting the telephone number receiving function, controller 10 operates and sets timer 15, thus enabling the time to be checked.

In step 201, controller 10 determines whether or not an incoming call is present through RF transmitting/receiving unit 18 and audio processing unit 20. Once an incoming call is present, controller 10 determines whether or not the telephone number receiving function is set, in step 202. When the telephone number receiving function is not set, controller 10 enables performance of the normal speech function between the caller and the called party in response to an off-hook operation performed by the called party, in step 203, and then ends the program. When the telephone number receiving function is set, however, controller 10 activates the speech mode in step 204 by controlling switching unit 21 and connecting audio processing unit 20 to speaker driving unit 26. In step 205, controller 10 enables generation of a voice message and tone that are transmitted to the caller through audio processing unit 20, RF transmitting/receiving unit 18 and antenna 22. This voice message provides a greeting to the caller and requests the caller to input his or her telephone number via the telephone keypad. Then, in step 206, controller 10 controls switching unit 21 to switch from the speech mode to the telephone number receiving mode by connecting audio processing unit 20 to DTMF decoder 24. In step 207, controller 10 determines whether or not DTMF signals are detected via DTMF decoder 24. DTMF decoder 24 decodes DTMF signals generated in response to the caller's inputs to generate the caller's telephone number. When the DTMF signals are detected, controller 10 proceeds to step 208 and displays the telephone number represented by the detected DTMF signals on display unit 16, and simultaneously stores the telephone number in memory 14. Thereafter, controller 10 receives the current time from timer 15, stores the current time in memory 14, and displays the current time on display unit 16. Then, in step 209, controller 10 determines whether or not a predetermined time has passed since the last DTMF signal was received. When the predetermined time has not passed, controller 10 proceeds back to steps 207 and 208. On the other hand, when the predetermined time has passed, controller 10 proceeds to step 210 and cuts off the speech path, thereby completing the program.

As is apparent from the foregoing, the method of displaying a telephone number received from a caller in a mobile cordless telephone according to the principles of the present invention is advantageous in that, when an incoming telephone call is present and the called party can not answer the call, so long as the telephone number receiving function is set, the caller's telephone number is automatically displayed for the called party.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof Therefore, it is intended that the present invention not be limited to the particular embodiment discloses as the best mode contemplated for carrying out the present invention, but that the present invention includes all embodiments falling within the scope of the appended claims.

What is claimed is:

1. A method for receiving a telephone number provided from a caller in a mobile cordless telephone, comprising the steps of:

determining whether a telephone number receiving function for said mobile cordless telephone is set when an incoming call to said mobile cordless telephone is received;

switching from a speech mode to a telephone number receiving mode and receiving said telephone number based on inputs provided from the caller when said telephone number receiving function is set; and concurrently storing in a memory and visually displaying on a display unit of said mobile cordless telephone said telephone number at said mobile cordless telephone when said telephone number receiving function is set.

2. The method as claimed in claim 1, further comprised of activating said speech mode and transmitting a tone to the caller after said determining step when said telephone number receiving function is set.

3. The method as claimed in claim 2, wherein said telephone number provided from the caller is identified at said mobile cordless telephone by decoding dual tone multi-frequency signals generated in response to inputs by the caller.

4. The method as claimed in claim 3, further comprised of displaying a current time after displaying said telephone number.

5. A device for receiving a telephone number from a caller in a mobile cordless telephone, comprising:

means for setting a telephone number receiving function of said mobile cordless telephone;

means for switching from a speech mode to a telephone number receiving mode in response to receipt of an incoming call by said mobile cordless telephone, when said telephone number receiving function is set;

means for identifying said telephone number in response to inputs provided from the caller; and means for concurrently visually displaying and storing said telephone number when said telephone number receiving function is set.

6. The device as claimed in claim 5, further comprising means for transmitting a tone to the caller during said speech mode when said telephone number receiving function is set.

7. The device as claimed in claim 6, wherein said telephone number received from the caller is identified by decoding dual tone multi-frequency signals generated in response to inputs by the caller.

8. The device as claimed in claim 7, further comprised of said means for visually display providing display of a current time after displaying said telephone number.

9. The device as claimed in claim 5, further comprising means for transmitting a voice message to the caller during said speech mode when said telephone number receiving function is set.

10. A method for receiving a telephone number provided from a caller in a mobile cordless telephone, comprising the steps of:

determining whether an incoming call is received at said mobile cordless telephone;

determining whether a telephone number receiving function of said mobile cordless telephone is set when said incoming call is received;

activating a speech mode of said mobile cordless telephone when said telephone number receiving function is set and said incoming call is received;

transmitting a voice message to the caller during said speech mode requesting the caller to provide input of said telephone number;

switching from said speech mode to a telephone number receiving mode after transmitting said voice message to the caller;

detecting dual tone multi-frequency signals representative of said telephone number in response to inputs provided from the caller; and providing concurrently visually displaying said telephone number on a display unit of said mobile cordless telephone and storing said telephone number in a memory of said mobile cordless telephone when said telephone number receiving function is set.

11. The method as claimed in claim 10, further comprised of decoding said dual tone multi-frequency signals to identify said telephone number.

12. The method as claimed in claim 10, further comprised of enabling performance of a speech function between the caller and a party corresponding to said mobile cordless telephone in response to the party performing an off-hook operation when said telephone number receiving function is not set and said incoming call is received.

13. A mobile cordless telephone, comprising:

an antenna;

first means connected to said antenna for receiving and transmitting electrical signals;

an audio processing unit connected to said first means for processing the electrical signals received and transmitted by said first means;

speaker means for providing output of an aural message;

a decoder for decoding the electrical signals received by said first means to identify a telephone number provided by a caller;

a switching unit for electrically connecting said audio processing unit to said speaker means during a speech mode of said mobile cordless telephone, and electrically connecting said audio processing unit to said decoder during a telephone number receiving mode of said mobile cordless telephone;

a memory for storing said telephone number provided by the caller;

display means for providing display of said telephone number provided by the caller; and control means for enabling the display of said telephone number on said display means by determining whether an incoming call is received at said mobile cordless telephone, determining whether a telephone number receiving function of said mobile cordless telephone is set when said incoming call is received, controlling said switching unit to activate said speech mode when said telephone number receiving function is set and said incoming call is received, enabling transmission of a voice message to the caller during said speech mode requesting the caller to provide said telephone number, controlling said switching unit to switch from said speech mode to said telephone number receiving mode after transmitting said voice message to the caller, identifying said telephone number based on the decoding performed by said decoder, and enabling the concurrent visual display of said telephone number on said display means and storing of said telephone number in said memory when said telephone number receiving function is set.

* * * * *